United States Patent [19]

Nakamura

[11] Patent Number: 5,340,249

[45] Date of Patent: Aug. 23, 1994

[54] WORK TRANSPORTATION APPARATUS AND WORK TRANSPORTATION METHOD

[75] Inventor: Yoshiki Nakamura, Kurashiki, Japan

[73] Assignee: Mitsubishi Jidosha Kogyo Kabushiki Kaisha, Tokyo, Japan

[21] Appl. No.: 953,465

[22] Filed: Sep. 29, 1992

[30] Foreign Application Priority Data

Oct. 3, 1991 [JP] Japan ............... 3-080563[U]

[51] Int. Cl.⁵ ................................. B60P 1/00
[52] U.S. Cl. ........................... 410/78; 410/2; 105/148
[58] Field of Search ............... 105/148; 104/89, 172.4; 198/678.1, 682, 473.1, 474.1, 476.1, 485.1, 487.1; 294/67.22, 67.3, 67.31, 67.33, 81.51, 81.54; 410/77, 78, 2

[56] References Cited

U.S. PATENT DOCUMENTS

| | | | |
|---|---|---|---|
| 94,461 | 8/1869 | Woodburry | 410/77 |
| 4,234,278 | 11/1980 | Harshman et al. | 410/77 |
| 4,341,161 | 7/1982 | Morita et al. | 104/89 |
| 4,462,315 | 7/1984 | Wakabayashi | 105/148 |
| 4,475,462 | 10/1984 | Tsumaki et al. | 104/89 |
| 4,579,062 | 4/1986 | Clark et al. | 105/148 |
| 4,583,896 | 4/1986 | Vogg et al. | 410/77 |
| 4,758,123 | 7/1988 | Corompt | 410/77 |
| 5,112,173 | 5/1992 | Eilemstein et al. | 410/77 |

FOREIGN PATENT DOCUMENTS

| | | | |
|---|---|---|---|
| 1963635 | 9/1970 | Fed. Rep. of Germany | 410/77 |
| 0120178 | 9/1979 | Japan | 104/89 |
| 0203608 | 12/1982 | Japan | 104/89 |
| 0306963 | 12/1988 | Japan | 105/148 |
| 0008610 | 1/1991 | Japan | 104/89 |

*Primary Examiner*—Mark T. Le
*Attorney, Agent, or Firm*—Abelman, Frayne & Schwab

[57] ABSTRACT

A work transportation apparatus including a base member having a supporting base on which a work is placed and moving to a predetermined direction, a fixed stop disposed on the base member and projecting above the base member to a predetermined height to hinder movement of the work on the supporting base, a moving stop protruding on the base member and vertically movable over a range from an upright position to hinder movement of different types of work to a withdrawing position moved down in the vicinity of a height of the supporting base, and a counterweight for exerting a force sufficient to lift the moving stop to the upright position.

13 Claims, 4 Drawing Sheets

WORK TRANSPORTATION APPARATUS AND WORK TRANSPORTATION METHOD

FIELD OF THE INVENTION

This invention relates to a work transportation apparatus and a work transportation method which are suitable for use in a conveyor hanger and the like of a body transportation facility used in an automobile assembly line or the like.

DESCRIPTION OF THE PRIOR ART

A conveyor hanger is used for transporting automobile bodies in a factory or the like which handles automobile bodies like an automobile assembly plant. For example, in an transportation facility using a trolley type conveyor hanger, a guide rail is disposed on the ceiling side of a building along the transportation facility for a work, that is, a body, and the hanger and the body are moved along the guide rail, with the body retained at a predetermined position by the hanger suspended form the guide rail.

The above conveyor hanger is provided at its lower portion with a supporting base, on which is placed a side sill of the lower portion of the body. A stop is mounted in the vicinity of the supporting base, and positions of a side sill end and a rising wall of a wheel house are adjusted by the stop to position the body in the longitudinal direction.

In general, length of the side sill varies with the vehicle type, however, since the stop used in the above prior art conveyor hanger is of a fixed type, the stop has been mounted at a position corresponding to a vehicle with a longest side sill length. Therefore, with increasing vehicle types, when the same hanger is used for a plurality of vehicle types with different side sill lengths, the stop is not able to effectively function when transporting a vehicle type with a short side sill length, leading to mispositioning of the body in the longitudinal direction.

Therefore, it is a primary object of the present invention to provide a work transportation apparatus and a work transportation method which can hold the work at a predetermined position even with a different work length such as side sill length.

SUMMARY OF THE INVENTION

In accordance with the present invention which attains the above object, there is provided a work transportation apparatus comprising a base member having a supporting base on which a work is placed, a fixed stop disposed on the base member and projecting above the base member to a predetermined height, a moving stop provided on the base member and vertically movable over a range from an upright position projected to a predetermined height to a withdrawing position moved down to a height in the vicinity of the supporting base, and urging means for exerting a force sufficient to lift the moving stop to the upright position. An example of the urging means is a weight, but a spring may alternatively be used rather than a weight.

There is also provided according to the present invention a work transportation method for placing a work on a supporting base on a base member moving in a predetermined direction, characterized in that a fixed stop or another moving stop regulates one end of the work when the work is in the course of moving down and presses down the moving stop, and the fixed stop regulates the one end of the work when the work is in the course of moving down and does not contact the moving stop, whereby the fixed stop or the moving stop are automatically selected to place the work on the supporting base according to a plurality of types of the work.

In the work transportation apparatus according to the present invention, since one end of the work does not reach the moving stop when a short-length work is placed on the supporting base, the moving stop is maintained at the upright position by the urging means. In this case, since the rising wall of the work opposes the moving stop, the longitudinal position of the work is regulated by the moving stop.

On the other hand, when a work having a length that reaches the moving stop is supported, part of the work rides on the moving stop, and the moving stop moves down to the withdrawing position. In this case, since the rising wall of the work opposes the fixed stop, the longitudinal position of the work is regulated by the fixed stop,

DESCRIPTION OF THE PREFERRED EMBODIMENTS

Figure 1:
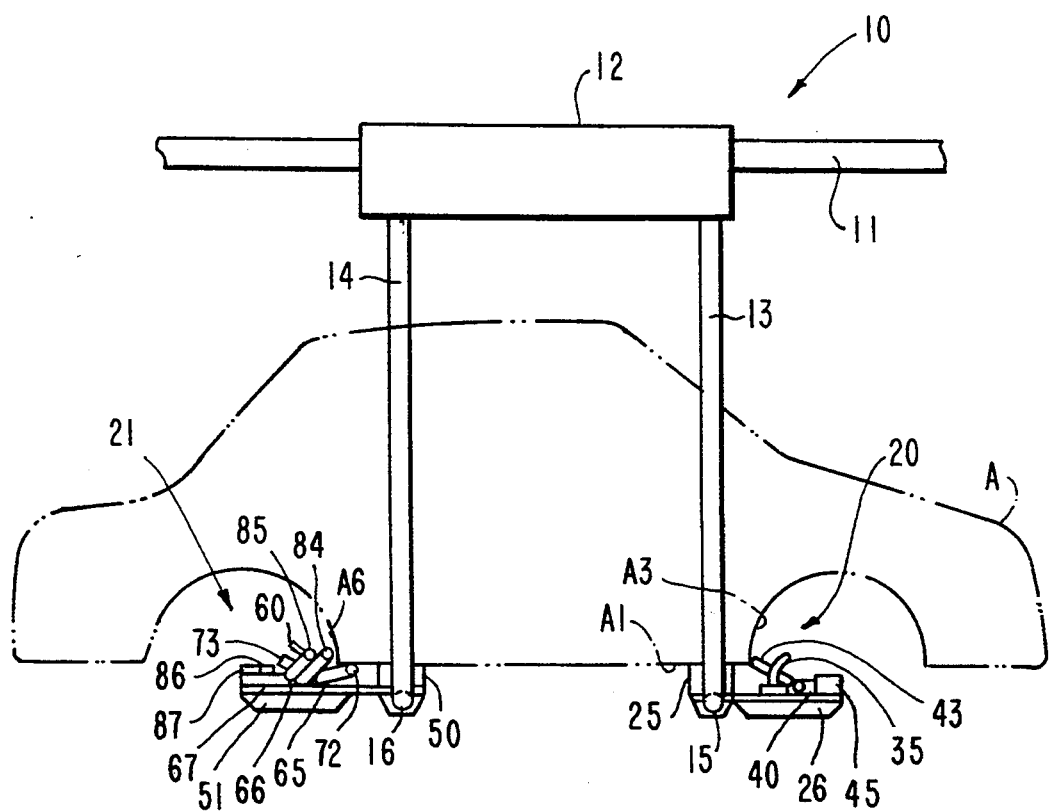
FIG. 1 is a schematic side of a conveyor hanger provided with an embodiment of the work transportation apparatus according to the present invention.

An embodiment of the present invention will now be described with reference to a conveyor hanger 10 shown in the drawings, The conveyor hanger 10 shown in FIG. 1 is used for transporting a body A as an example of work in an automobile body transportation facility.

The conveyor hanger 10 comprises a base frame 12 movable along a guide rail 11, a pair of front and rear side frames 13 and 14 extending below the base frame 12, and lower frames 15 and 16 extending in the width direction of the body A from lower ends of the side frames 13 and 14.

A front work supporting device 20 for supporting a front portion of the body A is provided in the vicinity of the front lower frame 15. A rear work supporting device 21 for supporting a rear portion of the body A is provided on the rear lower frame 16.

Figure 2:
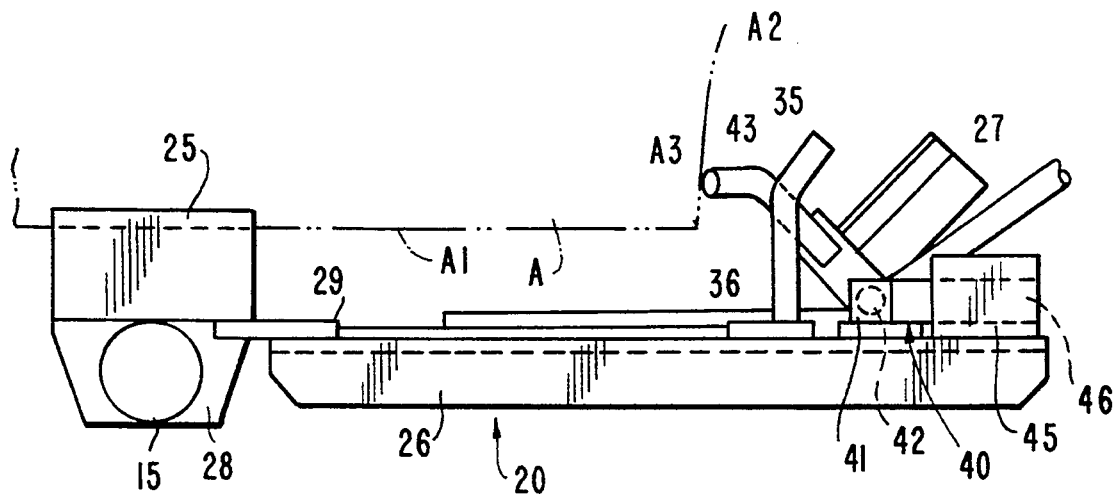
FIG. 2 is a schematic side view of a front supporting device in the conveyor hanger shown in FIG. 1.
Figure 3:
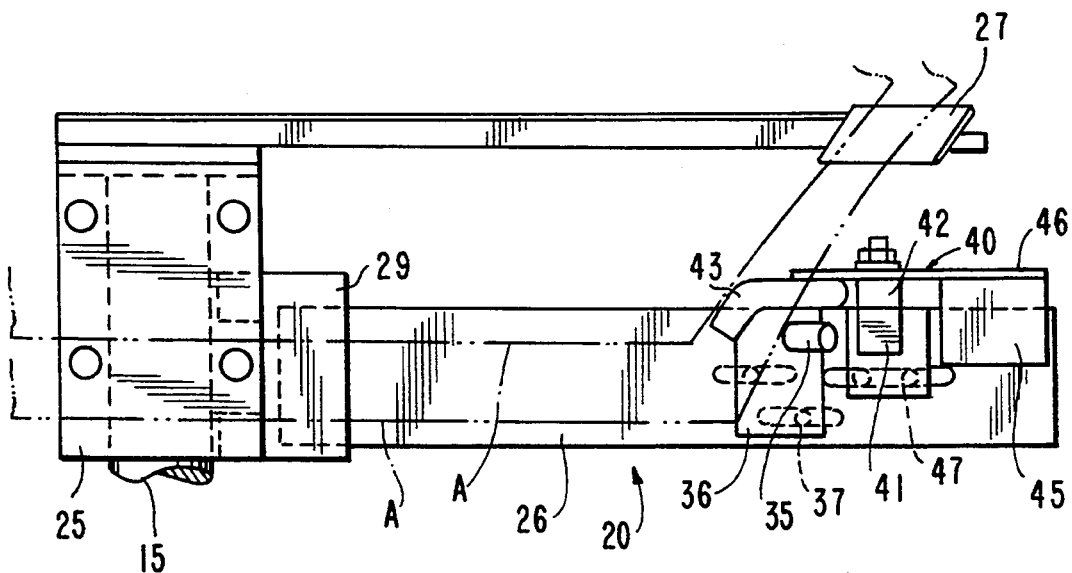
FIG. 3 is a schematic plan view of a front supporting device in the conveyor hanger shown in FIG. 1.

The front work supporting device 20 is structured as shown in FIG. 2 and FIG. 3. As shown in the Figures, the supporting device 20 has a supporting base 25 located on the lower frame 15, a base member 26 and an auxiliary support member 27 which extend to the front of the lower frame 15.

The supporting base 25 supports the body A at a predetermined height by supporting a side sill A1 of the body A from its lower side. The base member 26 is mounted to the lower frame 15 through brackets 28 and 29.

A fixed stop 35 is provided at a part close to the front end of the base member 26. A base part 36 of the fixed stop 35 is adapted so that its longitudinal position relative to the base member 26 can be adjusted to some extent. Top end of the fixed stop 35 projects to a position higher than the supporting base 25. The fixed stop 35 opposes a rising wall A3 of a wheel house A2 for front wheels of the body A.

A seesaw-formed front, moving piece 40 is provided in the vicinity of the fixed stop 35. The moving piece 40 mainly comprises a shaft 42 which is supported rotatable about a horizontal shaft by a bearing 41, a moving stop 43 projecting at a position closer to the supporting base 25 than the fixed stop 35, and an arm portion 46 having a weight 45. The bearing 41 is adjustable within a range for its longitudinal position relative to the base member 26 due to an adjuster mechanism, 47.

Figure 6:
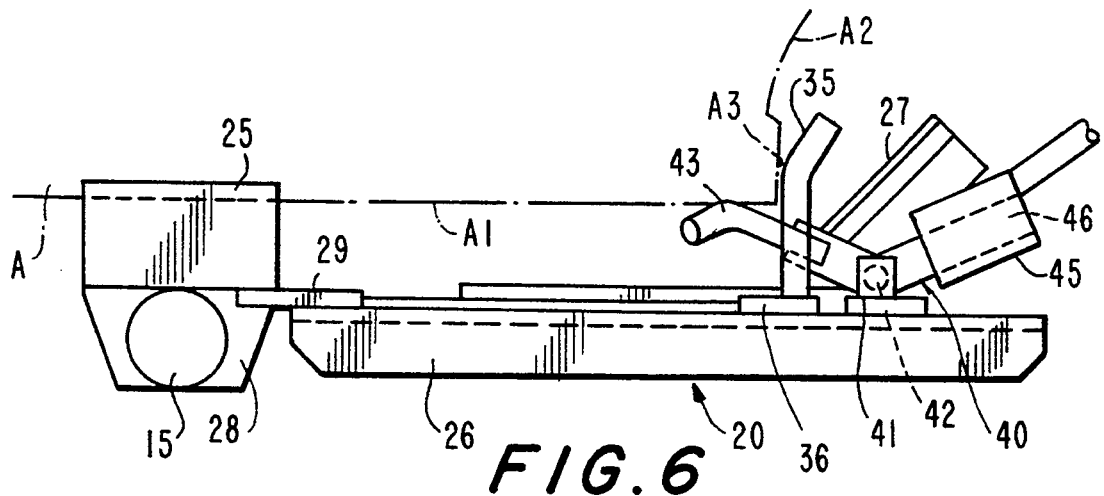
FIG. 6 is a schematic side view showing the front supporting device shown in FIG. 2 supporting a relatively long body.

The moving stop is vertically movable over the range from an upright position projecting to a position higher than the supporting base 25 as shown in FIG. 2 to a withdrawing position near the height of the supporting base 25 as shown in FIG. 6.

The weight 45 as an example of urging means has a weight sufficient to lift the moving stop 43 to the upright position (condition shown in FIG. 2). Therefore, in a free condition with no external force exerted, the moving stop 43 is maintained at its upright position due to the weight of the weight 45 itself.

Figure 4:
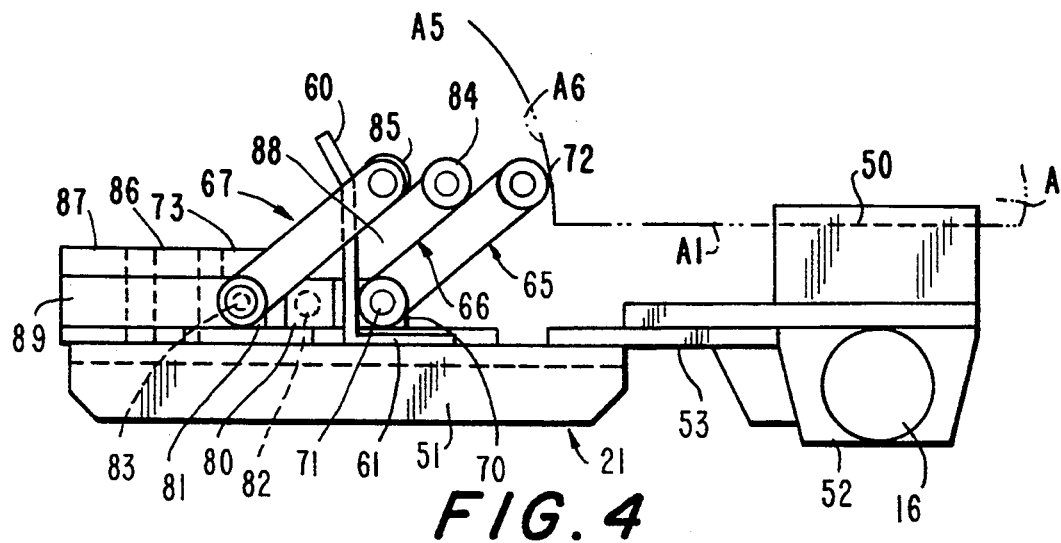
FIG. 4 is a schematic side view of a rear supporting device in the conveyor hanger shown in FIG. 1.
Figure 5:
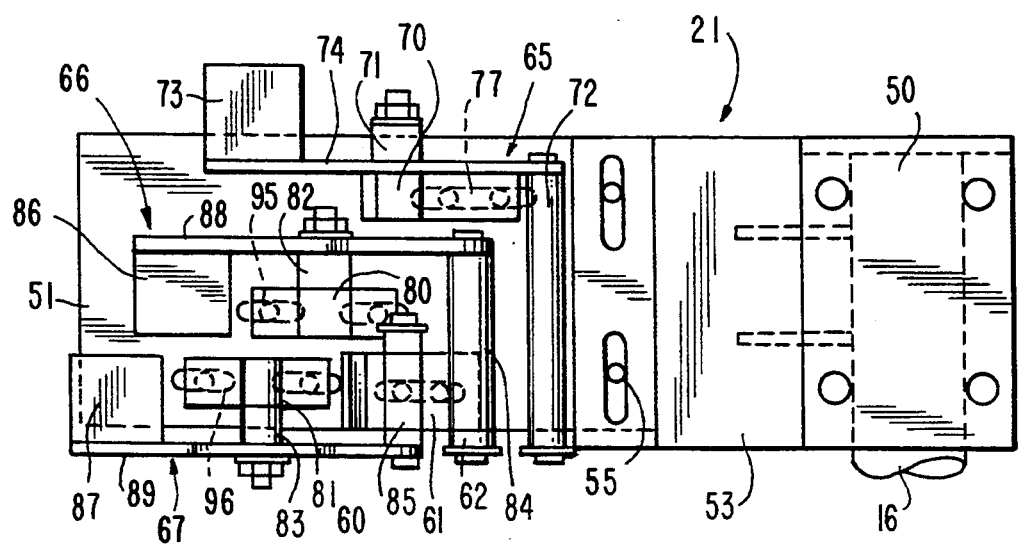
FIG. 5 is a schematic plan view of a rear supporting device in the conveyor hanger shown in FIG. 1.

The rear work supporting device 21 is structured as shown in FIG. 4 and FIG. 5. As shown in the Figures, the supporting device 21 has a supporting base 50 positioned on the lower frame 15, and a base member 51 extending to the rear of the lower frame 16. The supporting base 50 supports the body A at a predetermined height by supporting the side sill A1 of the body A from its bottom side.

The base member 51 is fixed to the lower frame 16 through brackets 52 and 53. The base member 51 can be adjusted to some extent by an adjuster mechanism 55 for its position in the width direction relative to the bracket 53.

A fixed stop 60 is provided at a portion close to a rear end of the base member 51. A base portion 61 of the fixed stop 60 can be adjusted to some extent for its position in the longitudinal direction relative to the base member 51. The fixed stop 60 opposes a rising wall A6 of a wheel house A5 for rear wheels of the body A.

A seesaw-formed first rear moving piece 65, a second rear moving piece 66, and a third rear moving piece 67 are provided in the vicinity of the fixed stop 60. The first rear moving piece 65 mainly comprises a shaft 71 which is supported rotatable about a horizontal shaft by a bearing 70, a moving stop 72 projecting at a position closer to the supporting base 50 than the fixed stop 60, and an arm portion 74 having a weight 73. The bearing 71 is adjustable to some extent for its longitudinal position relative to the base member 51 due to an adjuster mechanism 77.

Figure 7:
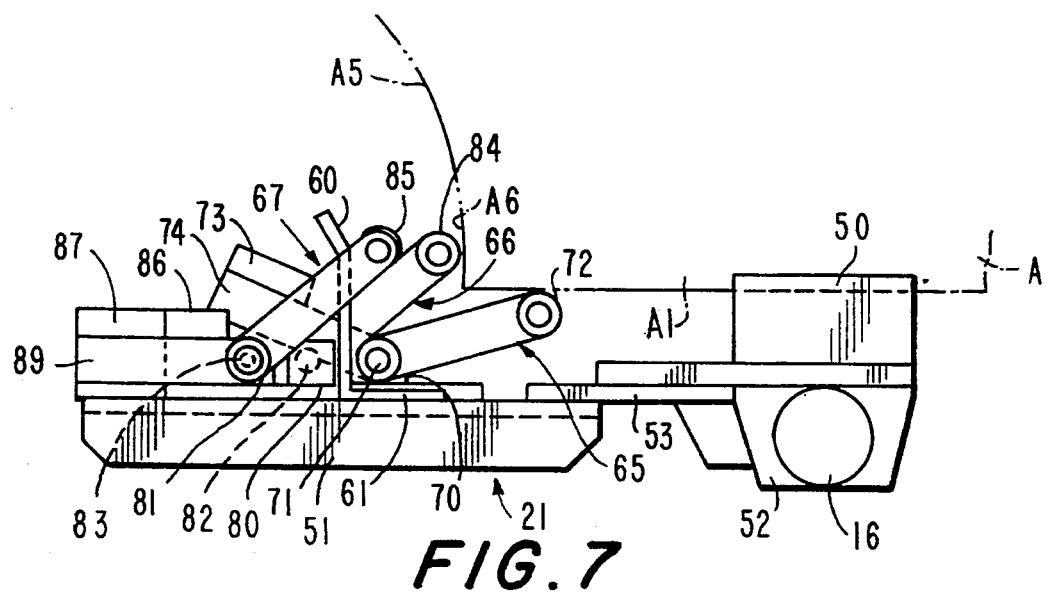
FIG. 7 is a schematic side view showing the rear supporting device shown in FIG. 4 supporting a relatively long body.

The moving stop 72 is vertically movable over the range from an upright position projecting to a position higher than the supporting base 50 as shown in FIG. 4 to a withdrawing position near the height of the supporting base 50 as shown in FIG. 7.

The weight 73 as an example of urging means has a weight sufficient to lift the moving stop 72 to the upright position (condition shown in FIG. 4). Therefore, in a free condition with no external force exerted, the moving stop 72 is maintained at its upright position due to the weight of the weight 73 itself.

The second moving piece 66 and the third moving piece 67 also have shaft portions 82 and 83 which are supported rotatable about horizontal shafts by bearings 80 and 81, moving stops 84 and 85 projecting to positions closer to the supporting base 50 than the fixed stop 60, and arm portions 88 and 89 having weights 86 and 87. The shaft portions 82 and 83 are adjustable to some extent for their longitudinal positions relative to the base member 51 due to adjuster mechanisms 95 and 96.

When the body A is transported using the conveyor hanger 10 having the front supporting device 20 and the rear supporting device 21 of the above structure, the moving stop 43 of the front supporting device 20 and the moving stops 72, 84, and 85 of the rear supporting device 21 selectively operate according to the length of the side sill A1, as will be described later, to hold the body A at a predetermined position.

Specifically, in the front supporting device 20, when a relatively short body A is supported on the supporting base 25 as shown in Fig.2, since the front end of the side sill A1 does not reach the moving stop 43, the moving stop 43 is maintained at the upright position merely by the weight of the weight 45. Therefore, in this case, forward movement of the rising wall A3 of the body A is regulated by the moving stop 43.

When a relatively long body A is supported at the front supporting device 20, since the front end of the side sill A1 rides on the moving stop 43 as shown in FIG. 6, the moving stop 43 is pressed down due to the weight of the body A. In this case, forward movement of the rising wall A3 of the body A is regulated by the fixed stop 35.

In the rear supporting device 21, on the other hand, when a shortest body A is supported on the supporting base 50 as shown in FIG. 4, since the rear end of the side sill A1 does not reach the moving stops 72, 84, and 85, all of the moving stops 72, 84, and 85 are maintained at the upright position due to the weight of the weights 73, 86, and 87. Therefore, in this case, rear movement of the rising wall A6 of the body A is regulated by the first moving stop 72.

In the rear supporting device 21, when a relatively long body A is supported, the rear end of the side sill. A1 rides on the first moving stop 72 as shown in FIG. 7, the first moving stop 72 retreats to the withdrawing position. The second moving stop 84 and the third moving stop 85 individually remain at the upright positions. Therefore, in this case, rear movement of the rising wall A6 is regulated by the second moving stop 84.

For an even longer body A, since the second moving stop 84 is pressed down and the third moving stop 85 is maintained at the upright position, rear movement of the rising wall A6 is regulated by the third moving stop 85.

Figure 8:
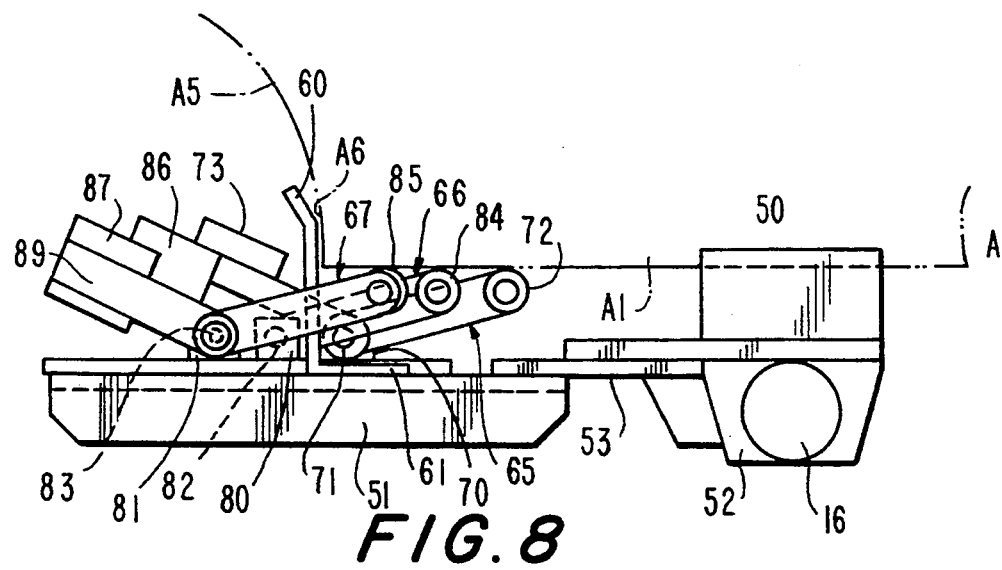
FIG. 8 is a schematic side view showing the rear supporting device shown in FIG. 4 supporting a longest body.

When a longest body A is supported as shown in FIG. 8, the body A rides on all of the moving stops 72, 84, and 85. In this case, the fixed stop 60 opposes the rising wall A6 of the body A, thus regulating rear movement of the body A.

As described above, the moving stops 43, 72, 84, and 85 can be selectively operated according to the length of the side sill A1 to position the body A in the longitudinal direction, adapting to a plurality of side sill lengths. Since the moving stops 43, 72, 84, and 85 are all reverted back to the upright positions automatically due to the weight of the weights 45, 73, 86, and 87, actuators for returning can be eliminated, and positive operation is assured even with a simple structure, with improved reliability.

In the present invention, the number of moving stops can be flexibly determined as needed. The object of the present invention can be attained if a moving stop is provided at least one of the front supporting device 20 and the rear supporting device 21.

With the present invention, the moving stops are automatically changed over to the upright positions or withdrawing positions according to the length of the work, thereby achieving positioning of the work regardless of its length.

What is claimed is

1. An apparatus for use in transporting workpieces of varied sizes, comprising:

a horizontally arranged first base member;

a first fixed stop mounted on said first base member and permanently extending upwardly from said first base member;

a first retractable stop member mounted on said first base member and including means allowing the first retractable stop member to move between a first position in which said first retractable stop member extends upwardly from said first base member, and a second retracted position in which said first retractable stop member is retracted downwardly towards said first base member;

means biasing said first retractable stop member towards said extended first position;

said first retractable stop member providing an abutment for a workpiece of an appropriate size, and automatically being moved to said retracted second position by the placement of a workpiece of a larger size on said first base member; and said first fixed stop and said first retractable stop member being disposed in juxtaposition, on said first base member.

2. The apparatus of claim 1, including:

a horizontally arranged second base member positioned in longitudinally spaced relation with the first base member;

a second fixed stop mounted on said second base member and extending upwardly from the second base member;

a second retractable stop member mounted on said second base member and including means allowing the second retractable stop member to move between a first position in which said second retractable stop member extends upwardly from second base member, and a second retracted position in which said second retractable stop member is retracted downwardly towards the second base member; and means biasing said second retractable stop member towards said extended first position, said second retractable stop member providing an abutment for a workpiece of an appropriate size, and automatically being moved to said retracted position by the placement of a workpiece of larger size on said second base member.

3. The apparatus of claim 1, further including a plurality of such first retractable stop member mounted on said first base member, said first retractable stop members each providing an abutment for a workpiece of an appropriate size, and automatically being moved to said retracted position by the placement of a workpiece of a larger size on said first base member.

4. The apparatus of claim 2, further including a plurality of such first retractable stop member mounted on said first base member, said first retractable stop members each providing an abutment for a workpiece of an appropriate size, and automatically being moved to said retracted position by the placement of a workpiece of a larger size on said first base member.

5. The apparatus of claim 1, in which said first retractable stop member is provided by a lever pivoted for movement on a horizontal axis, and said biasing means is operative to bias said lever to said first position.

6. The apparatus of claim 2, in which each of said first and second retractable stop members is provided by a lever pivoted for movement on a horizontal axis, and said biasing means is separately provided to each said lever, to bias each said lever to said first position.

7. The apparatus of claim 5, in which said biasing means is provided by a counterweight operatively associated with said lever.

8. The apparatus of claim 6, in which each said biasing means is provided by a counterweight operatively associated with each said lever.

9. The apparatus of claim 1, further including means permitting adjustment of said first fixed stop and said first retractable stop member relative to said first base member.

10. The apparatus of claim 2, further including means permitting adjustment of each said fixed stop and each said retractable stop member relative to the associated base member.

11. An apparatus for use in transporting of workpieces of different sizes, comprising:

at least on guide rail;

a frame supported on said guide rail for movement longitudinally of said guide rail;

horizontally arranged base members supported in longitudinally spaced relation on said frame;

a fixed stop mounted on each said base member and permanently extending upwardly from said each said base member;

a retractable stop member mounted on at least one of said base members, and including means allowing said retractable stop member to move between a first position in which said retractable stop member extends upwardly from said at least one of said base members, and a second retracted position in which said retractable stop member is retracted downwardly towards said at least one of said base members;

means biasing said retractable stop member towards said extended position, said retractable stop member providing an abutment for a workpiece of an appropriate size, and automatically being moved to said retracted position by the placement of a workpiece of a larger size on said at least one of said base members;

said fixed stop and said retractable stop member being disposed in juxtaposition, on the respective base member.

12. The apparatus of claim 11, further including plurality of such retractable stop member mounted on at least one of said base members at selected positions, said retractable stop members each providing an abutment for a workpiece of an appropriate size, and automatically being moved to said retracted position by the placement of a workpiece of a larger size on the respective base member.

13. A method of transporting workpieces of different sizes, comprising:

providing a supporting base member;

providing retractable stop members on said base member, each said retractable stop member operative to engage one of said workpieces;

employing the weight of one of said workpieces to retract those retractable stop members that are positioned beneath said one of said workpieces;

employing one of the retractable stop members that is not positioned beneath said one of said workpieces, and that is in proximity to said one of said workpieces, to locate said one of said workpieces in a determined position on said base member;

employing a fixed stop permanently extending upwardly from said base member, to locate a workpiece of a largest size in a determined position on said base member;

arranging said fixed stop and at least one of said retractable stop members in juxtaposition, on said base member.

* * * * *